United States Patent Office 3,438,882
Patented Apr. 15, 1969

3,438,882
PROCESS FOR THE PREPARATION OF OXYGEN-CONTAINING CHEMICAL COMPOUNDS
John J. Beereboom, Jr., Old Lyme, and Jay S. Buckley, Jr., Groton, Conn., assignors to Chas. Pfizer & Co., Inc., New York, N.Y., a corporation of Delaware
No Drawing. Filed Sept. 11, 1964, Ser. No. 395,905
Int. Cl. B01j 1/10
U.S. Cl. 204—158          14 Claims

ABSTRACT OF THE DISCLOSURE

Benzoyl peroxide preparation by contacting benzalchloride with benzoic acid in the presence of an electrophilic reagent capable of complexing with said chloride at elevated temperatures to obtain benzaldehyde and benzoic anhydride followed by oxidation in the presence of alkali and alkaline earth metal sulfates or benzoates. A mixture of benzalchloride and benzotrichloride may be employed in lieu of said benzalchloride reactant. Said oxidation is promoted by low intensity irradiation. Benzoic anhydride oxidation may employ hydrogen peroxide.

---

This invention relates to an improved process for preparing diacyl peroxides and more particularly to the preparation of benzoyl peroxide and valuable intermediates from which it is derived.

In addition to benzoyl peroxide which finds extensive use as a polymerization catalyst and food additive, the synthetic route disclosed herein provides a convenient and facile means for preparing useful intermediates, namely, benzaldehyde and benzoic anhydride. Benzaldehyde and benzoic anhydride are used in the synthesis of a wide variety of organic chemicals.

The present day commercial synthesis of benzoyl peroxide reportedly consists of treating benzyol chloride with sodium or hydrogen peroxide. A method for the preparation of benzoyl peroxide has now been discovered which avoids the use of expensive sodium or hydrogen peroxide and, in addition, provides valuable intermediates as by-products. According to the new process benzoyl peroxide, benzaldehyde and benzoic anhydride are obtained by a two step reaction sequence. The first step comprises converting benzalchloride and benzoic acid to benzaldehyde and benzoic anhydride wherein said benzoic acid is present in sufficient amount to provide about .1 to 1 equivalent per equivalent of said benzalchloride in the presence of at least 0.1% by weight of an electrophilic reagent capable of complexing with said chloride at a temperature between about 150 and 250° C. until substantial reaction has occurred. Conditions more particularly preferred are those in which benzoic acid is present in an amount to provide 0.8 to .9 equivalent per equivalent of benzalchloride, said electrophilic reagent is magnesium chloride and said reaction temperature is 190–200° C. Improvement in yield of benzaldehyde is obtained when an excess of benzalchloride is present in the reaction mixture; however, satisfactory results are achieved whein stoichiometric equivalent amounts of said reactants are utilized.

Moreover, the incorportion of an electrophilic reagent, for example, magnesium chloride, into the reaction mixture is found to increase the yields of benzaldehyde substantially. However, the electrophilic reagent does not function as a catalyst but appears to prevent side reactions that previously caused the lower yields of products. In this connection, it is believed that said electrophilic reagent complexes with said chloride in such a manner as to prevent undesirable side reactions and hence, higher yields are obtained. Examples of suitable electrophilic reagents which are acceptable include $CaCl_2$, $AlCl_3$, and $SnCl_4$.

A useful modification of the above reaction consists in reacting benzoic acid with a mixture of benzalchloride and benzotrichloride which comprises contacting said mixture with from about 0.1 to 1 equivalent of benzoic acid per equivalent of said chloride mixture, the amount of benzoic acid being sufficient to provide at least 1 equivalent per equivalent of benzalchloride. The reaction conditions are substantially the same as described earlier. The practicality lies in the fact that benzalchloride and benzotrichloride can be prepared simultaneously by the commercial chlorination of toluene, and the mixture so obtained can be used directly in the hereindescribed reaction process without the necessity of separation of products. Yields of products obtained by using a mixture of chloro derivatives are not affected, and the reaction in general proceeds smoothly. Similarly, it is more desirable to run the reaction wherein said mixture is present in an amount to provide a slight excess, although satisfactory yields are obtained when stoichiometric equivalent amounts are used. More particularly preferred is the use of 0.8 to 0.9 equivalent of benzoic acid per equivalent of combined organic chloride.

The advantage in providing at least 1 equivalent of benzoic acid per equivalent of benzalchloride in the mixture is based on product yields and more particularly on the yield of benzaldehyde. If less than 1 equivalent of benzoic acid per equivalent of benzalcholride is used, the yield of benzaldehyde is substantially reduced. Said reduction in yield of benzaldehyde prohibits the second step of our process to be carried out directly without first isolating the products. Hence, two interrelated benefits are derived by adhering to the above-said limitation. The first relates to an increase in yield of benzaldehyde, and the second to a processing innnovation wherein the subsequent or second step may be carried out directly eliminating a time consuming isolation step.

The second step in our process is an oxidation reaction which comprises oxidizing a mixture of benzaldehyde and benzoic anhydride wherein said benzoic anhydride is present in an amount to provide from about 0.1 to 1 equivalent per equivalent of benzaldehyde, in the presence of a catalytic amount of a compound selected from the group consisting of alkali and alkaline earth metal sulfates and benzoates in a reaction inert medium until substantial conversion to benzoyl peroxide has occurred.

A reaction temperature range of 0 to 50° C. is acceptable but more particularly preferred is a reaction temperature of from 20 to 30° C. Suitable catalysts include sodium and potassium benzoate, magnesium sulfate and potassium sulfate. By an inert medium is meant one which will not react with the reactants or final products, and still enable the reaction to progress satisfactorily. Examples of suitable inert media include water, chloroform, benzene, acetone, methylene chloride, carbon tetrachloride and mixtures thereof. More preferred is a mixture of water and one of the aforementioned organic solvents which minimizes the hazards involved in the formation of peroxides. For example, substantial amounts of benzoyl peroxide are obtained when a chloroform-water mixture is utilized. Oxidation can be achieved by passing air through the reaction mixture, although oxygen gas is more particularly preferred.

A beneficial and interesting innovation in the abovesaid oxidation consists of irradiating the reaction mixture with a very low intensity irradiation source, for example, an ordinary sunlamp. The advantages offered by such an irradiation are twofold: improvement of product-yields and decrease in total reaction time. Improvement in yields may be as much as 10% with respect to any one particular reaction medium. Moreover, a decrease in reaction times of ⅓ has been observed. Due to the great amount of heat emitted by such an irradiation, it is desirable to cool the reaction vessel in some manner, for example, by a cold water bath or external air-blowing.

A further related reaction disclosed in this invention for the preparation of benzoyl peroxide involves the use of hydrogen peroxide as an oxidizing agent. The reaction comprises treating benzoic anhydride with hydrogen peroxide wherein said hydrogen peroxide is present in an amount to provide at least 1 equivalent per equivalent of benzoic anhydride in a reaction inert medium at a temperature between about 0° and 50° C. until substantial conversion to benzoyl peroxide has occurred.

More desirable conditions are those in which the reaction temperature is from about 1 to about 25° C. and said peroxide is present in an amount to provide from about 0.8 to about 0.9 equivalent per equivalent of benzoic anhydride. The term reaction inert medium is as defined earlier. Suitable examples include water, acetone, chloroform, benzene and mixtures thereof.

The following examples are provided by way of illustration and should not be interpreted as limiting the invention, many variations of which are possible without departing from the spirit or scope thereof.

Example I

A mixture of benzoic acid (24.4 g., 0.2 M) and anhydrous $MgCl_2$ (200 mg.) is melted by heating slowly to 125° C. followed by the addition of benzachloride (16.1 g., 0.1 M). The reaction temperature is then raised to 170° C. and held there for 5 hours. The reaction mixture is subsequently distilled by fractionation to give yields of 7.5 g. (71%) of benzaldehyde and 20.7 g. (92%) of benzoic anhydride.

Example II

The experiment of Example I is repeated except for the mole-ratio of reactants as noted below, and benzaldehyde and benzoic anhydride is obtained in substantial amounts:

Benzoic acid _____ 19.5 g., 0.16 M
Benzalchloride _____ 16.1 g., 0.1 M
Magnesium chloride _____mg.___ 200

Example III

The experiment of Example I is repeated wherein an equivalent amount of calcium chloride in lieu of magnesium chloride is used, and substantially the same yields are obtained.

Example IV

The experiment of Example I is repeated wherein an equivalent amount of tin chloride in lieu of magnesium chloride is used, and substantially the same yields are obtained.

Example V

Benzoic acid (61 g., 0.5 M) is melted by heating to 125° C. and the temperature raised to 200° C. whereupon magnesium chloride (1.0 g.) is added. A solution of benzalchloride (24.2 g., 0.15 M) and benzotrichloride (19.5 g., 0.1M) is then added dropwise over a 15 min. period, and the reaction temperature raised to 240° C. at which point benzaldehyde is distilled from the reaction mixture. The residue is distilled by fractionation under vacuum to obtain benzoic anhydride. The yields of benzaldehyde and benzoic anhydride are 72 and 93% respectively.

Example VI

The experiment of Example V is repeated except for the mole-ratio of reactants as noted below, and benzaldehyde and benzoic anhydride are obtained in substantial amounts:

Benzoic acid _____ 48.8 g., 0.4 M
Benzalchloride _____ 24.2 g., 0.15 M
Benzotrichloride _____ 19.5 g., 0.1 M
Magnesium chloride _____g.__ 1.0

Example VII

The experiment of Example V is repeated wherein equivalent amounts of aluminum chloride in lieu of magnesium chloride is used, and substantially the same results are obtained.

Example VIII

Air is bubbled through sintered glass into a mixture containing benzaldehyde (5.3 g., 0.05 M), benzoic anhydride (11.2 g., 0.1 M), sodium benzoate (200 mg.) and methylene chloride (100 ml.) for 6 hours maintaining the reaction temperature at 20° C. On completion of said time period, the reaction mixture is evaporated in vacuo nearly to dryness, and 20 ml. of methanol is added. The crystalline benzoyl peroxide is filtered, and a second crop is obtained from the mother liquor by further evaporation and filtration. The combined crops of benzoyl peroxide represents a yield of 69%.

Example IX

The experiment of Example VIII is repeated except as noted below and substantially the same results are obtained:

| Solvent | Catalyst | Oxidizing agent |
| --- | --- | --- |
| Water | Magnesium sulfate | Air. |
| Water-acetone (1:1) | Sodium sulfate | Air. |
| Chloroform | Potassium benzoate | Oxygen. |
| Acetone | Calcium benzoate | Air. |
| Benzene | Potassium benzoate | Oxygen. |
| Carbon tetrachloride | Sodium benzoate | Do. |

Example X

The procedure of Example VII is repeated wherein the reaction mixture is irradiated with a 250 watt G.E. sunlamp for a period of 2 hours at a temperature of 20° C. In order to maintain said temperature, a jet-stream of air is directed on the reaction vessel during the irradiation period. Similar work-up gives a 70% yield of benzoyl peroxide.

A yield of 45% is obtained when the above procedure is repeated using water as the reaction medium.

Example XI

The reaction mixture consisting of benzaldehyde and benzoic acid obtained by the procedure of Example I is subsequently converted to benzoyl peroxide employing the procedure of Example VIII.

Example XII

To a cooled solution of 10 ml. of 30% $H_2O_2$ (0.088 M) diluted to 30 ml. with water is added dropwise a solution of benzoic anhydride (11.3 g., 0.050 M) in 50 ml. acetone over a period of 1 hour maintaining the temperature at 3° C. On completion of said period, the benzoyl peroxide is removed by filtration. A second crop is obtained by cooling and refiltering the mother liquor. The combined weight of benzoyl peroxide represents a yield of 70%.

When the above procedure is repeated using a water emulsion system, substantially the same results are obtained.

What is claimed is:

1. The process which comprises contacting benzalchloride with from about 0.1 to 1 equivalent of benzoic acid per equivalent of benzalchloride in the presence of at least 0.1% by weight of an electrophilic reagent capable of complexing with said chloride and at a temperature between about 150 and 250° C. to obtain a reaction mixture including benzaldehyde and benzoic anhydride, subsequently contacting aforesaid reaction mixture with oxygen in the presence of a reaction inert medium containing a catalytic amount of a compound selected from the group consisting of alkali and alkaline earth metal sulfates and benzoates at a temperature between 0 and 50° C., and recovering resulting benzoyl peroxide.

2. The process of claim 1 wherein said electrophilic reagent is selected from the group consisting of magnesium chloride, aluminum chloride, tin chloride, and calcium chloride.

3. The process of claim 1 wherein said electrophilic reagent is magnesium chloride.

4. The process which comprises contacting a mixture of benzalchloride and benzotrichloride with from about 0.1 to 1 equivalent of benzoic acid per equivalent of said chloride mixture, the amount of benzoic acid being sufficient to provide at least 1 equivalent per equivalent of benzalchloride, in the presence of at least about 0.1% by weight of an electrophilic reagent capable of complexing with said chloride and at a temperature between about 150 and 250° C. to obtain a reaction mixture including benzaldehyde and benzoic anhydride, subsequently contacting aforesaid reaction mixture with oxygen in the presence of a reaction inert medium containing a catalytic amount of a compound selected from the group consisting of alkali and alkaline earth metal sulfates and benzoates at a temperature between 0 and 50° C. and recovering resulting benzoyl peroxide.

5. The process which comprises contacting benzalchloride with from about 0.1 to 1 equivalent of benzoic acid per equivalent of benzalchloride in the presence of at least about 0.1% by weight of an electrophilic reagent capable of complexing with said chloride and at a temperature between about 150 and 250° C. to obtain a reaction mixture including benzaldehyde and benzoic anhydride as the principal reaction products, and recovering said reaction products.

6. The process of claim 5 wherein said electrophilic reagent is magnesium chloride.

7. The process of claim 5 wherein each equivalent of benzalchloride is contacted with from about 0.8 to 0.9 equivalents of benzoic acid.

8. The process which comprises contacting a mixture of benzalchloride and benzotrichloride with from about 0.1 to 1 equivalent of benzoic acid per equivalent of said chloride mixture, the amount of benzoic acid being sufficient to provide at least 1 equivalent per equivalent of benzalchloride, in the presence of at least about 0.1% by weight of an electrophilic reagent capable of complexing with said chloride and at a temperature between about 150 and 250° C. to obtain a reaction mixture including benzaldehyde and benzoic anhydride as the principal reaction products, and recovering said reaction products.

9. The process of claim 8 wherein each equivalent of said chloride mixture is contacted with from about 0.8 to 0.9 equivalent of benzoic acid.

10. The process which comprises contacting a mixture of benzaldehyde and benzoic anhydride containing from about 0.1 to 1 equivalent of benzoic anhydride per equivalent of benzaldehyde with oxygen in the presence of a reaction inert medium containing a catalytic amount of a compound selected from the group consisting of alakli and alkaline earth metal sulfates and benzoates at a temperature between about 0 and 50° C., and recovering resulting benzoyl peroxide.

11. The process of claim 10 wherein sodium benzoate is employed.

12. The process of claim 10 wherein said reaction inert medium is chloroform.

13. The process of claim 10 wherein said reaction inert medium is water.

14. The process of claim 10 including the step of irradiating the reaction mixture with low intensity irradiation of wavelength 180 m$\mu$ to about 400 m$\mu$.

References Cited
UNITED STATES PATENTS

| | | | |
|---|---|---|---|
| 1,948,342 | 2/1934 | Dvornikoff | 260—546 X |
| 2,973,310 | 2/1961 | Whitfield | 204—158 |
| 3,087,967 | 4/1963 | Graham et al. | 260—599 |

HOWARD S. WILLIAMS, *Primary Examiner.*

U.S. Cl. X.R.

260—546, 599, 610